(12) United States Patent
Karlsson et al.

(10) Patent No.: US 11,463,514 B2
(45) Date of Patent: Oct. 4, 2022

(54) METHODS AND APPARATUSES FOR BALANCING UTILIZATION OF COMPUTER RESOURCES

(71) Applicant: Telefonaktiebolaget LM Ericsson (publ), Stockholm (SE)

(72) Inventors: Pär Karlsson, Karlskrona (SE); Lars Haraldsson, Ronneby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/283,182

(22) PCT Filed: Oct. 8, 2018

(86) PCT No.: PCT/EP2018/077242
§ 371 (c)(1),
(2) Date: Apr. 6, 2021

(87) PCT Pub. No.: WO2020/074054
PCT Pub. Date: Apr. 16, 2020

(65) Prior Publication Data
US 2021/0344749 A1    Nov. 4, 2021

(51) Int. Cl.
*H04L 12/00*    (2006.01)
*H04L 67/1034*    (2022.01)
(Continued)

(52) U.S. Cl.
CPC ........ *H04L 67/1034* (2013.01); *G06F 9/5088* (2013.01); *G06F 16/278* (2019.01);
(Continued)

(58) Field of Classification Search
CPC . H04L 67/10; H04L 67/1012; H04L 67/1029; H04L 67/1008; H04L 67/1034; G06F 16/278; G06F 9/5088
(Continued)

(56) References Cited

U.S. PATENT DOCUMENTS

| | | | | |
|---|---|---|---|---|
| 7,197,547 B1 * | 3/2007 | Miller | ................. | G06F 16/9574 709/223 |
| 7,509,407 B2 * | 3/2009 | Miller | .................... | G06Q 10/06 709/223 |

(Continued)

OTHER PUBLICATIONS

Honicky, R. J., et al., "Replication Under Scalable Hashing: A Family of Algorithms for Scalable Decentralized Data Distribution", Proceedings of the 18th International Parallel and Distributed Processing Symposium (IPDPS 2004), Santa Fe, NM, Apr. 2004, 1-10.

(Continued)

*Primary Examiner* — Frantz Coby
(74) *Attorney, Agent, or Firm* — Murphy, Bilak & Homiller, PLLC

(57) ABSTRACT

Methods and apparatus for balancing resource utilization as described herein enable the use of distributed allocation architectures with minimal coordination signaling. Among the multiple advantages gained are reduced overhead signaling, greater implementation flexibility, and improved adaptability to changes in the system state. Here, "system state" refers to the subset (16) of servers (12) that are currently available among a set (14) of servers (12) targeted for use in load balancing. Of course, the contemplated methods and apparatus do not foreclose centralization of at least some of the load-balancing operations and associated data management.

17 Claims, 6 Drawing Sheets

(51) Int. Cl.
  *G06F 16/27* (2019.01)
  *G06F 9/50* (2006.01)
  *H04L 67/1008* (2022.01)
  *H04L 67/1012* (2022.01)
  *H04L 67/1029* (2022.01)

(52) U.S. Cl.
  CPC ...... *H04L 67/1008* (2013.01); *H04L 67/1012* (2013.01); *H04L 67/1029* (2013.01)

(58) Field of Classification Search
  USPC .......................................... 709/203, 224, 241
  See application file for complete search history.

(56) References Cited

U.S. PATENT DOCUMENTS

| | | | | |
|---|---|---|---|---|
| 9,235,856 | B2* | 1/2016 | Parker | H04L 67/10 |
| 9,712,386 | B1* | 7/2017 | Chen | H04L 41/0806 |
| 9,825,769 | B2* | 11/2017 | Batz | H04L 12/1407 |
| 10,404,479 | B2* | 9/2019 | Zhang | H04L 12/1467 |
| 10,404,791 | B2* | 9/2019 | Puri | G06F 9/5083 |
| 2006/0212453 | A1* | 9/2006 | Eshel | H04L 67/1034 |
| 2008/0195755 | A1* | 8/2008 | Lu | H04L 45/00 709/241 |
| 2009/0171821 | A1* | 7/2009 | Denker | G06Q 40/12 705/30 |
| 2014/0149794 | A1 | 5/2014 | Shetty et al. | |
| 2015/0058404 | A1* | 2/2015 | Agrawal | H04L 67/1034 709/203 |
| 2016/0142475 | A1* | 5/2016 | Kathuria | H04L 67/1008 709/203 |
| 2016/0269439 | A1* | 9/2016 | Ho | H04L 63/1441 |
| 2018/0176074 | A1* | 6/2018 | Bangalore Krishnamurthy | H04L 47/125 |

OTHER PUBLICATIONS

Thaler, David G., et al., "A Name-Based Mapping Scheme for Rendezvous", Electrical Engineering and Computer Science Department, The University of Michigan, Ann Arbor, Michigan, Nov. 13, 1996, 1-31.

* cited by examiner

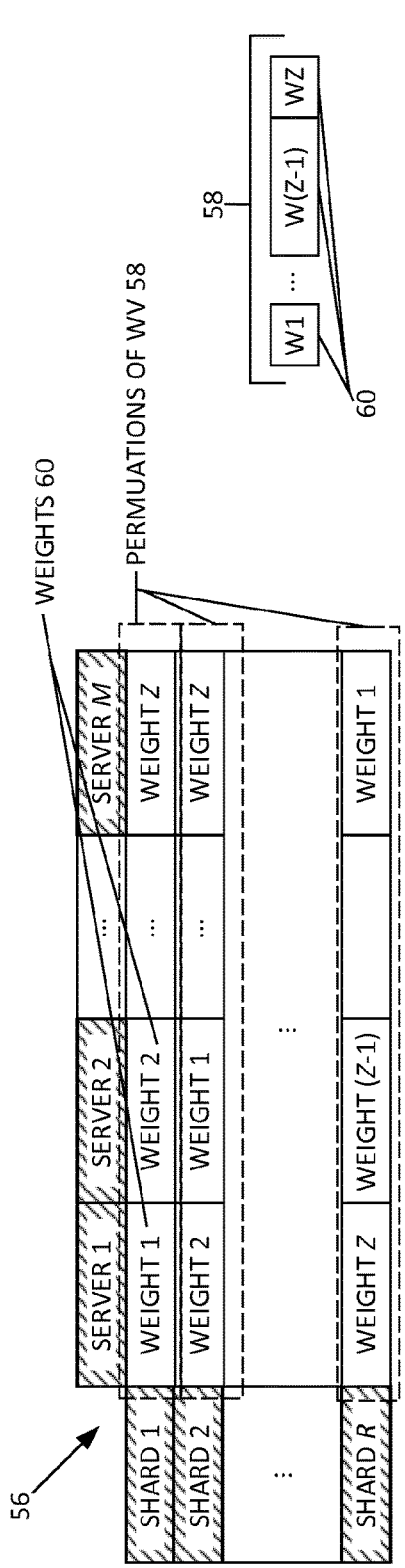
FIG. 3A
FIG. 3B
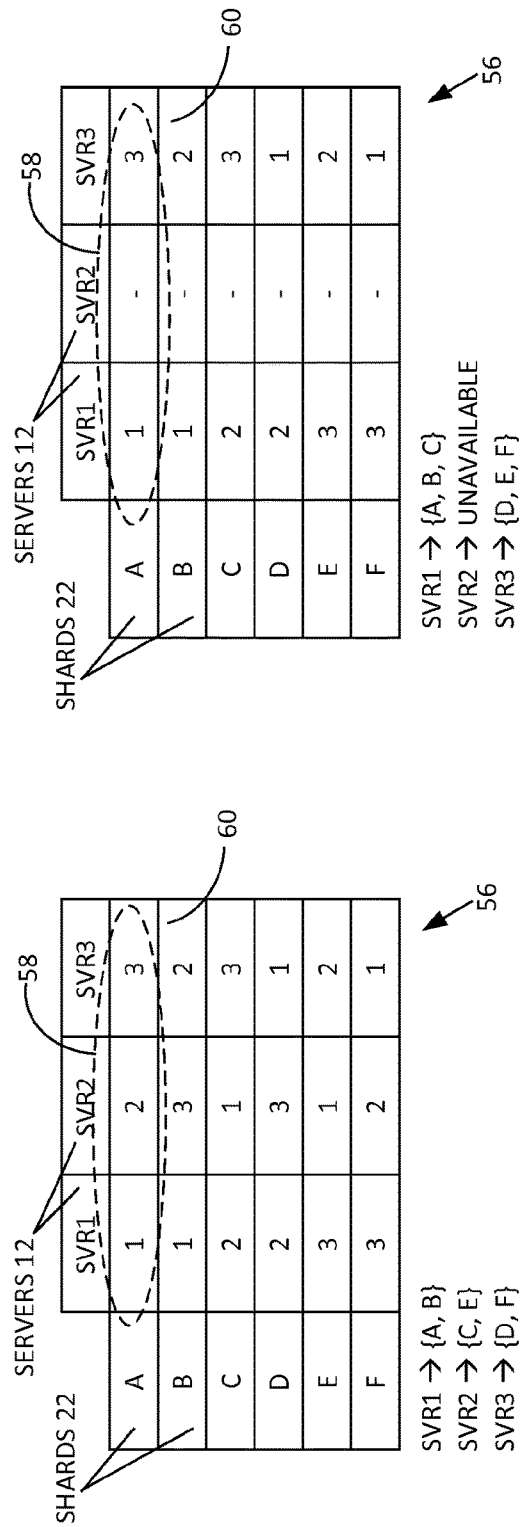
FIG. 4
FIG. 5

METHODS AND APPARATUSES FOR BALANCING UTILIZATION OF COMPUTER RESOURCES

TECHNICAL FIELD

The present invention relates to balancing the use of computer resources across a set or pool of computer servers.

BACKGROUND

"Load balancing" refers to the distribution of "objects" across a pool of computer servers or other processing nodes that are collectively available for handling incoming objects. The term "object" represents a processing task, data for storage, or another thing that consumes processing or storage "resources" in a computer-system context.

In a web-server example, the objects may comprise HyperText Transfer Protocol (HTTP) requests incoming to a pool of web servers. However, other contexts involve more complex objects. For example, the "objects" in question comprise provisioning jobs associated with activating devices or otherwise provisioning communication services for network subscribers. Each such job involves a coordinated set or flow of processing operations, database updates, and various other related, interdependent tasks, which must be tracked by the computer server as part of maintaining job status or context information.

Object-to-server allocation schemes include round-robin or even-distribution schemes, and random distribution schemes, which also aim for uniform distribution of objects across the pool of available servers. Alternatives or additional layers of sophistication consider various "weights" or other factors, such as the respective processing capacities of the servers in the pool.

"Sharding" represents another known mechanism for distributing an overall set of objects, e.g., processing tasks, data items, etc., across servers. In a database context involving a pool of database servers, sharding a database involves dividing the overall data set into multiple "shards". Each shard contains a subset of the data set, and each database server in the pool handles only one or a subset of the overall number of shards.

Key goals arising in the context of load balancing include various aspects of "efficiency", "fairness", and "resiliency". One view on efficiency involves the overhead or amount of signaling by or on behalf of the nodes involved in the load balancing and the amount of information that must be maintained to track allocations, object states, etc., across the pool of nodes. Fairness refers to the balancing effort, with the goal of avoiding overloading any one of the servers while also efficiently utilizing the computing resources at hand. Resiliency refers to the ability of the load-balancing architecture to respond to or recover from the loss of a node within the pool.

Interplay exists between efficiency and resiliency. For example, some load-balancing schemes implement a highly centralized management structure that provides a mechanism for tracking object state and object-to-server allocations, thereby enabling objects to be redistributed from a failed server to other servers in the pool. However, while such arrangements provide for good resiliency, at least concerning changes in server availability, they often require significant signaling overhead. Moreover, the centralization itself adds a point of vulnerability.

SUMMARY

Methods and apparatus for balancing resource utilization as described herein enable the use of distributed allocation architectures with minimal coordination signaling. Among the multiple advantages gained are reduced overhead signaling, greater implementation flexibility, and improved adaptability to changes in the system state. Here, "system state" refers to the subset of servers that are currently available among a set of servers targeted for use in load balancing. Of course, the contemplated methods and apparatus do not foreclose centralization of at least some of the load-balancing operations and associated data management.

An example method of balancing resource utilization among a set of servers includes determining a system state for the set of servers, wherein some of the servers in the set may be unavailable. The system state is defined by the subset of servers that are currently available from among the set of servers, and the number of possible system states is the number of unique subsets of servers from among the set of servers. The method further includes assigning individual shards to respective ones among the subset of available servers according to a shard-to-server allocation scheme. At least for "mapped" ones of the possible system states, the shard-to-server allocation scheme prescribes an allocation of the shards among the subset of servers belonging to each mapped system state and minimizes the number of shard reassignments needed when the system state changes. Each shard is one among a set of shards, and each shard comprises a logical container for objects. Each object comprises a job object or a storage object that requires respective resources on the server to which the object is assigned.

The method further includes allocating new objects incoming to the set of servers for processing to respective ones of the shards according to an object-to-shard allocation scheme that balances resource requirements across the shards. Still further, responsive to the system state changing from a first one of the mapped system states to a second one of the mapped system states, the method includes reassigning individual ones of the shards from one server to another, as needed, in view of the differences between the shard-to-server assignments prescribed by the shard-to-server allocation scheme for the first and second mapped system states.

In a related example, a computer processing apparatus is operative to balance resource utilization among a set of servers and comprises interface circuitry and processing circuitry. The processing circuitry is configured to communicate via the interface circuitry and, based on such communications, determine a system state for the set of servers, wherein some of the servers in the set may be unavailable. The system state is defined by the subset of servers that are currently available from among the set of servers, and the number of possible system states is the number of unique subsets of servers from among the set of servers.

The processing circuitry is further configured to assign individual shards to respective ones among the subset of available servers according to a shard-to-server allocation scheme that, at least for mapped ones of the possible system states, prescribes a defined allocation of the shards among the subset of servers belonging to each mapped system state and minimizes the number of shard reassignments needed when the system state changes. Each shard is one among a set of shards and comprises a logical container for objects, and each object comprises a job object or a storage object that requires respective resources on the server to which the object is assigned. The processing is further configured to allocate new objects incoming to the set of servers for processing to respective ones of the shards according to an object-to-shard allocation scheme that balances resource requirements across the shards. Still further, in response to the system state changing from a first one of the mapped system states to a second one of the mapped system states, the processing circuitry is configured to reassign individual ones of the shards from one server to another, as needed, in view of the differences between the shard-to-server assignments prescribed by the shard-to-server allocation scheme for the first and second mapped system states.

Another example embodiment or implementation comprises a computer-readable medium storing a computer program. The computer program comprises program instructions that, when executed by processing circuitry of a computer processing apparatus, configures the computer processing apparatus to balance resource utilization among a set of servers. In this context, the computer program comprises program instructions causing the computer processing apparatus to determine a system state for the set of servers, wherein some of the servers in the set may be unavailable. The system state is defined by the subset of servers that are currently available from among the set of servers, and the number of possible system states is the number of unique subsets of servers from among the set of servers.

The computer program further comprises program instructions that, when executed by the processing circuitry of the computer apparatus, configure the computer apparatus to assign individual shards to respective ones among the subset of available servers according to a shard-to-server allocation scheme that, at least for mapped ones of the possible system states, prescribes a defined allocation of the shards among the subset of servers belonging to each mapped system state and minimizes the number of shard reassignments needed when the system state changes. Each shard is one among a set of shards and comprises a logical container for objects, and each object comprises a job object or a storage object that requires respective resources on the server to which the object is assigned.

The computer program further comprises program instructions that, when executed by the processing circuitry of the computer apparatus, configures the computer apparatus to: allocate new objects incoming to the set of servers for processing to respective ones of the shards according to an object-to-shard allocation scheme that balances resource requirements across the shards; and, responsive to the system state changing from a first one of the mapped system states to a second one of the mapped system states, reassigning individual ones of the shards from one server to another, as needed, in view of the differences between the shard-to-server assignments prescribed by the shard-to-server allocation scheme for the first and second mapped system states.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 3A is a diagram of an example data structure embodying an assignment weight scheme underlying an example shard-to-server allocation scheme that minimizes shard-to-server migrations when adapting to changes in system state.

FIG. 3B illustrates a weighting vector for use in the context of FIG. 3A.

FIGS. 4 and 5 illustrate example uses of the data structure introduced in FIG. 3A.

DETAILED DESCRIPTION

Figure 1:
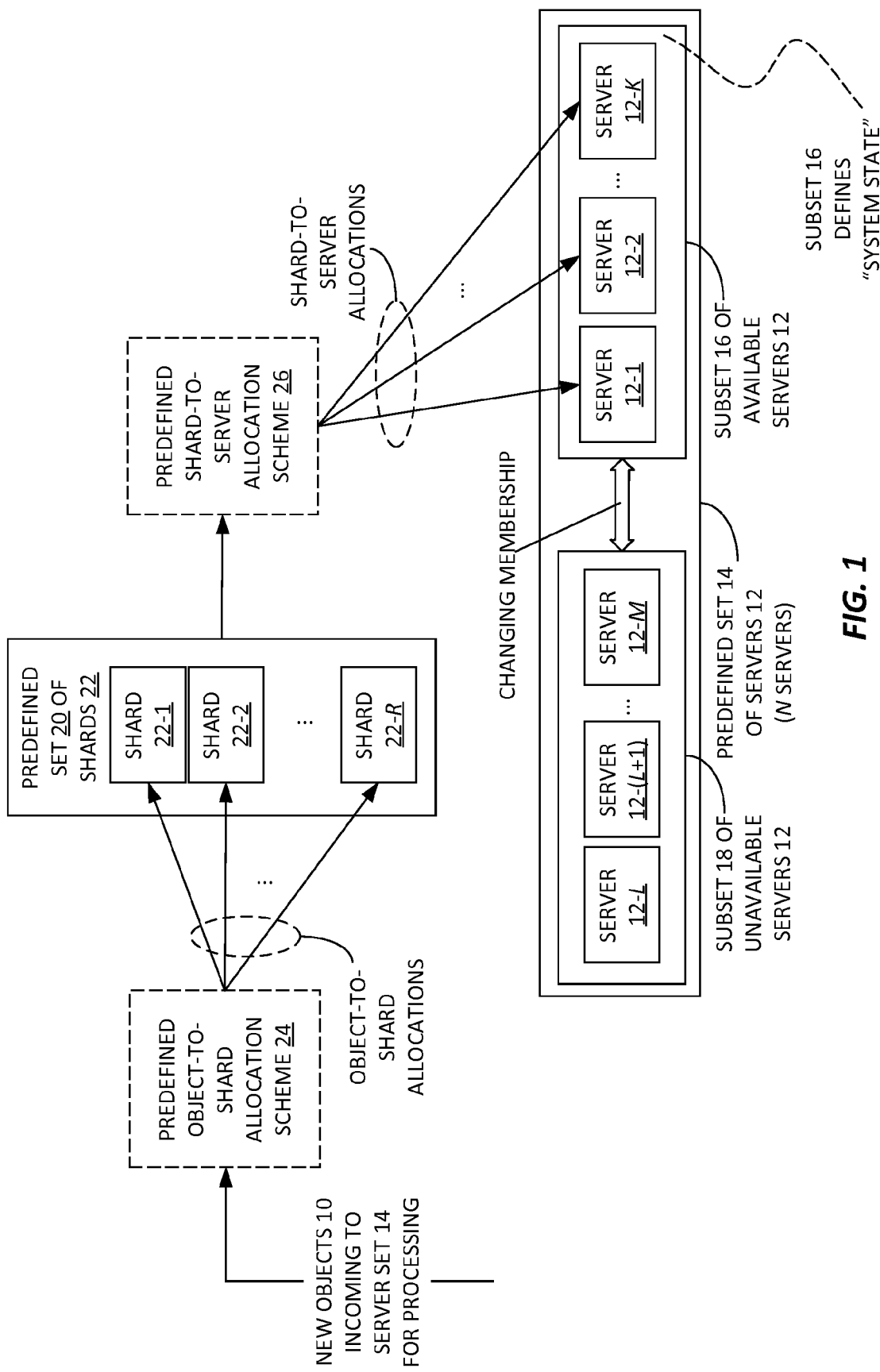
FIG. 1 is a block diagram of one embodiment of example object-to-shard and shard-to-server allocation schemes, for load balancing of resource utilization across available servers within a set of servers.

FIG. 1 illustrates "objects" 10 incoming to a number of computer servers 12 for processing. Where their use aids clarity, suffixes distinguish between respective ones of the computer servers 12, e.g., 12-1, 12-2, and so on. Where suffixes are not needed for clarity, the reference number "12" applies generically, to any given computer server or servers.

A set 14 of computer servers 12—"servers 12"—includes a subset 16 of available servers 12 and a subset 18 of unavailable servers 12. If there are N servers 12 in the set 14, K servers 12 in the available subset 16, and M servers 12 in the unavailable subset 18, then K+M=N and K=N−M, where K, M, and N are integer values. The number "N" represents a defined server count—i.e., a defined or designed-for maximum number of possibly available servers 12 that defines the size of the set 14. However, at any given time, some of the servers 12 in the set 14 may be unavailable—whether as a consequence of being offline, failed, or not yet installed. Servers 12 that are unavailable, whether because they are not present or are offline or are unusable for some other reason, necessarily belong to the subset 18 of unavailable servers 12.

Changes in membership for the two subsets 16 and 18 arise dynamically, such as with the deployment of new servers 12, or with off-line or failed servers 12 returning to operational status. A server 12 belongs to the M servers 12 in the subset 18 if it is unavailable for use in load balancing, including the case where it has not been installed or otherwise activated for operation. The value of N, therefore, may be a notional value representing a planned or designed-for number of servers.

A set 20 of shards 22 includes a number R of shards, where R is an integer value of 2 or greater. As with the servers 12, suffixes are used when referring to shards 22, when such use aids clarity. Otherwise, the reference number "22" applies generically to any given shard or shards. Each shard 22 comprises a logical container for objects 10. Each object 10 comprises a job object or a storage object that requires respective resources on the server 12 to which the object 10 is assigned. Correspondingly, a object-to-shard allocation scheme 24 and a shard-to-server allocation scheme 26, described herein in various example implementations, provide an advantageous mechanism for load balancing resource utilization across the subset 16 of available servers 12.

Among its various advantages, the contemplated load-balancing mechanism balances resource requirements across the shards 22 and minimizes the number of shard reassignments needed when membership in the subset 16 of available servers 12 changes. Membership changes in the subset 16 of available servers 12 constitute "system state" changes because they increase or decrease the count of servers 12 available for load balancing and/or change the particular subset of servers 12 that are available for load balancing. The shard-to-server allocation scheme 26, in particular, allocates shards 22 in view of the respective system states in a manner that reduces the number of shard migrations needed, e.g., to account for the loss of an existing available server 12, the addition of a newly available server 12, or any change of membership in the subset 16 of available servers 12.

Figure 2:
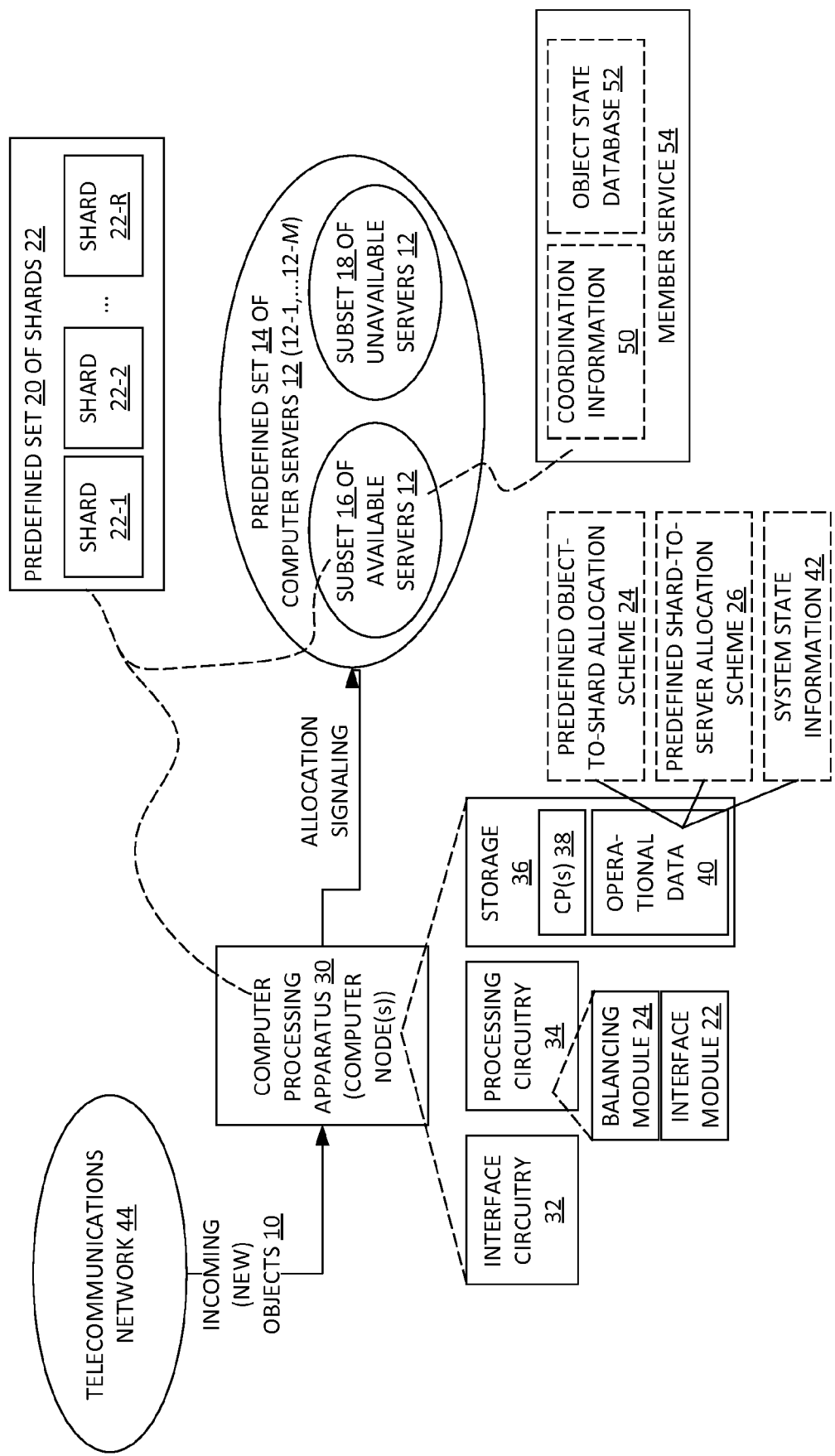
FIG. 2 is a block diagram of one embodiment of a computer apparatus configured to perform load balancing of resource utilization across available servers, according to object-to-shard and shard-to-server allocation schemes.

FIG. 2 illustrates a computer processing apparatus 30, which may be implemented as a centralized node with respect to the set 14 of servers 12 introduced in FIG. 1, or in a distributed fashion across the servers 12 included in the subset 16 of available servers 12. In a centralized implementation example, the computer processing apparatus 30 comprises a node that is separate from the servers 12 but communicatively linked to at least one of the available servers 12, to provide allocation control and coordination among the available servers 12. Here, the phrase "available server 12" refers to any server 12 that is currently a member of the available subset 16. In a distributed implementation example, the computer processing apparatus 30 is implemented in whole or in part in each of the available servers 12. For example, each available server 12 is configured to take ownership of individual ones of the incoming objects 10, based on a shared knowledge of the object-to-shard allocation scheme 24 and the shard-to-server allocation scheme 26.

Whether implemented in a centralized or distributed embodiment, the computer processing apparatus 30 is operative to balance resource utilization among a set 14 of servers 12 and comprises interface circuitry 32 and processing circuitry 34 that is configured to communicate via the interface circuitry 32. Based on such communications, the processing circuitry 34 is configured to determine a system state for the set 14 of servers 12, wherein some of the servers in the set may be unavailable. The system state is defined by the subset 16 of servers 12 that are currently available from among the set 14 of servers 12, and the number of possible system states is the number of unique subsets of servers 12 from among the set 14 of servers 12.

Further, the processing circuitry 34 is configured to assign individual shards 22 to respective ones among the subset 16 of available servers 12 according to a shard-to-server allocation scheme 26 that, at least for mapped ones of the possible system states, prescribes a defined allocation of the shards 22 among the subset of servers 12 belonging to each mapped system state and minimizes the number of shard reassignments needed when the system state changes. Here, a "mapped" system state is one that is specifically accounted for in a table structure that defines shard-to-server allocations or, equivalently, accounted for in a dynamically-determined shard-to-server allocation. Each shard 22 is one among a set 20 of shards 22 and comprises a logical container for objects 10. Each object 10 comprises a job object or a storage object that requires respective resources on the server 12 to which the object 10 is assigned.

Still further, the processing circuitry 34 is configured to allocate new objects 10 incoming to the set 14 of servers 12 for processing to respective ones of the shards 22 according to an object-to-shard allocation scheme 24 that balances resource requirements across the shards 22. Further, responsive to the system state changing from a first one of the mapped system states to a second one of the mapped system states, the processing circuitry 34 is configured to reassign individual ones of the shards 22 from one server 12 to another, as needed, in view of the differences between the shard-to-server assignments prescribed by the shard-to-server allocation scheme 26 for the first and second mapped system states.

Storage 36 is included in the computer processing apparatus, in one or more embodiments. The storage 36 comprises a computer-readable medium or computer-readable media. In an example implementation, the storage 36 comprises volatile storage, such as working computer memory for program execution, and non-volatile storage, such as may be used for longer-term storage of one or more computer programs 38 and certain operational data 40. The operational data 40 includes, for example, information defining the object-to-shard allocation scheme 24, the shard-to-server allocation scheme 26, and system state information 42. The allocation schemes may be represented as formula or configured calculations, or data structures, or some combination thereof. The system state information 42 includes at least some "live" operational data reflecting the current subset 16 of available servers 12 among the set 14 of servers 12.

The computer processing apparatus 30 generates allocation signaling that controls the allocation of incoming objects 10 to respective shards 22 among the set of shards 20 and controls the allocation of shards 22 to respective servers 12 among the subset 16 of available servers 12. In a centralized implementation, the computer processing apparatus 30 is communicatively coupled to one or more of the available servers 12 via its interface circuitry 32. In a distributed implementation, the interface circuitry 32 collectively represents respective interface circuitry in each of the available servers 12, and the allocation signaling comprises coordination signaling going between the available servers 12.

In either the centralized case or the distributed case, the computer processing apparatus 30 may generate or otherwise maintain coordination information 50 and an object state database 52, as part of providing a "member service" 54 that tracks object-to-shard and shard-to-server assignments and progress or status information associated with assigned objects 10. The member server 54 is also referred to as the "server member service" 54, to emphasize its coordinative nature. The coordination information 50 in one or more embodiments indicates the particular servers 12 that are current members of the available subset 16 of servers 12, indicates the objects 10 assigned to each shard 22, and indicates the current shard-to-server assignments, also referred to as shard-to-server allocations.

Among its several uses, the coordination information 50 and object state database 52 allow for the migration of shards 22 from one server 12 to another, and carrying over, to the greatest extent possible, the "states" of the objects 10 contained in the shard(s) 22 being migrated. As an example, if an allocated object 10 is a processing job, the execution state or other extent-of-job-completion information may be included in the object state database 52, so that another server 12 does not have to repeat all job processing if it receives or otherwise takes responsibility for the object 10 during a shard migration undertaken in response to a change in the system state.

Continuing with details of the processing circuitry 34 in one or more embodiments, the processing circuitry 34 is configured to uniquely identify each shard 22 in the set 20 of shards 22 by a corresponding shard identifier and uniquely identify each server 12 in the set 14 of servers 12 by a corresponding server identifier. In such embodiments, the shard-to-server allocation scheme 26 imposes a fixed mapping of shard identifiers to server identifiers, for each mapped system state.

All objects 10 may have comparable resource requirements. In a corresponding example implementation, the object-to-shard allocation scheme 24 allocates new objects 10 incoming to the set 14 of servers 12 for processing by one of: randomly assigning each new object 10 to one of the shards 22 in the set 20 of shards 22; assigning each new object 10 to one of the shards 22 in the set 20 of shards 22 according to a round-robin scheme; or assigning each new object 10 to one of the shards 22 in the set 20 of shards 22 according to hash-based scheme.

On the other hand, it may be that not all objects 10 have comparable resource requirements. In a corresponding example implementation, the object-to-shard allocation scheme 24 allocates new objects 10 incoming to the set 14 of servers 12 for processing by allocating each new object 10 in dependence on the resource requirements of the new object 10.

Further, it may be that not all servers 12 in the set 14 of servers 12 have equal capacities. In a corresponding example implementation, the object-to-shard allocation scheme 24 allocates new objects 10 incoming to the set 14 of servers 12 for processing by allocating each new object 10 in dependence on the respective capacities of the servers 12 in the set 14 of servers 12.

In at least one embodiment, the processing circuitry 34 is configured to implement the shard-to-server allocation scheme 26 as a lookup table, such as the example look-up table 56 shown in FIG. 3A. The example look-up table 56 includes a column for each server 12 in the set 14 of servers 12. If the maximum number of fielded or planned for servers 12 is ten, the table 56 would have ten columns. In FIG. 3A, there are M servers 12 in the set 14. One approach to sharding uses a number of shards 22 equal to the factorial of the maximum number of servers 12, which would be M!. Thus, R=M! in FIG. 3A, where R denotes the number of shards 22 in the set 20 of shards 22.

Each row in the table 56 corresponds to a respective one of the shards 22 in the set 20, and it includes a permutation of a weight vector 58 that includes a set of weights 60. FIG. 3B shows an example weight vector 58 that includes as many unique weights 60 as there are servers M in the set 14. The weights 60 may be integer values or real values, for example, but no two weights 60 in the weight vector 58 are alike, because each weight 60 represents a shard-to-server allocation preference.

Each row in the table 56 includes a permuted copy of the weight vector 58, such that each cell in the table 56 represents a shard-to-server allocation weight or preference, with respect to the corresponding shard 22 and the corresponding server 12. Consequently, for each shard 22, there is a single most-preferred server 12 as between any subset of two or more servers 12 in the overall set 14. Moreover, when looking "down" the columns of the table 56, one sees that the permutations of the weight vector 58 provide for a balanced allocation of shards 22 to servers 12, for any size and mix of membership in the subset 16 of available servers 12.

FIGS. 4 and 5 illustrate example load balancing via the use of the table 56, for an example case where the set 14 of servers 12 includes three servers 12, i.e., the maximum server count M=3. The three servers 12 are labeled as SVR1, SVR2, and SVR3. For M=3, the number R of shards 22 is 3! or 6. The six shards 22 are labeled as A, B, C, D, E, and F in FIGS. 4 and 5.

Further, in FIGS. 4 and 5, an example weight vector 58 includes three weights 60, shown here as integer or logical values "1", "2", and "3", with "1" representing the highest assignment preference and "3" representing the lowest assignment preference. The row for shard A in the table 56 in FIG. 4 includes a first permutation of the weight vector 58, {1, 2, 3}, the row for shard B includes a second permutation for the weight vector 58, {1, 3, 2}, and so on. Assuming a first "system state" (SYSTEM STATE 1) where the subset 16 of available servers 12 equals the maximum number M of servers 12 in the set 14, the following shard-to-server allocations apply as a consequence of the weight-vector permutations: SVR1→{A, B}, SVR2→{C, E}, SVR3→{D, F}.

FIG. 5 assumes a change from SYSTEM STATE 1 to SYSTEM STATE 2, where SVR2 is unavailable, and the subset 14 of available servers 12 is {SVR1, SVR3}. The permutation-based logic embodied in the table 56 drives an advantageous reallocation process that minimizes the number of shard migrations needed in view of the loss of SVR2. Namely, the loss of SVR2 does not result in any changes to the previous allocations of shards 22 to the servers SVR1 and SVR3; shards A and B remain allocated to SVR1 and shards D, and F remain allocated to SVR3. The only changes needed are the reallocation of shards C and E from SVR2 to respective ones of the available servers SVR1 and SVR3, according to the applicable weights 60. For shard C, the weight 60 corresponding to SVR1 is "2" and the weight 60 corresponding to SVR3 is "3", thus shard C is reallocated to SVR1. For shard E, the weight 60 corresponding to SVR1 is "3" and the weight 60 corresponding to SVR3 is "2", thus shard E is reallocated to SVR3.

The computer processing apparatus 30 updates all allocation information to reflect the reallocations and the affected servers 12 take over responsibility for the shards 22 and contained objects 10 that are migrated to them. Thus, in one or more embodiments, the processing circuitry 34 of the computer processing apparatus 30 is configured to maintain an object state database 52 indicating current states of the objects 10 that have been allocated to each shard 22 and use the object state database 52 to restore or resume processing associated with each object 10 in a given shard 22, when the given shard 22 is reassigned from one server 12 to another server 12. The object-state database 52 may be centralized or replicated at least in part at each available server 12. Providing each available server 12 with object-state information for all currently-allocated objects 10 allows any given one of the available servers 12 to resume or restart object processing, as needed when taking over responsibility for objects 10 contained in a shard 22 reassigned to the given available server 12.

As an alternative to using the table 56, the allocation logic represented by the table 56 may be realized via a formula or other calculation procedure, e.g., to provide on-the-fly determination of allocations. Determining allocations by calculation saves memory that would otherwise be used to hold the table, at the expense of greater computational complexity. Even when the table 56 is used, the table 56 may not be fully "populated". That is, with the system state being defined by which servers 12 belong to the subset 16 of available servers 12, the table 56 need not account for subsets 14 that are highly unlikely, such as subsets corresponding to more than a threshold number of servers 12 being unavailable. For unlikely subsets 14 of available servers, the table 56 may use a randomized allocation, rather than coordinated permutations of the weight vector 58. System states accounted for according to permutation-based assignment logic embodied in the shard-to-server allocation scheme 26 are referred to as "mapped" states.

FIG. 6A illustrates an example embodiment of a computer server 12-X, where the "X" denotes any given one of the servers 12 included in the set 14. The example server 12-X includes interface circuitry 62, processing circuitry 64, and storage 66. The storage 66 comprises one or more types of computer-readable media and, in one or more embodiments, stores one or more computer programs 68 and various operational data 70, which may include a copy of all or part of the coordination information 50 previously described. The storage 66 also may store a copy of all or part of the object state database 52 previously described, as part of the operational data 70, or the computer server 12-X otherwise has access to the object state database 52.

Further, the operational data 70 in one or more embodiments includes data structures or other information—such as formulas or calculations—embodying the object-to-shard allocation scheme 24 and the shard-to-server allocation scheme 26. Still further, the operational data 70 in one or more embodiments includes information representing at least the shards 22 allocated to the server 12-X and the objects 10 contained in them. In at least one embodiment, such as in a distributed embodiment of the computer processing apparatus 30, the operational data 70 may include information representing the complete set of shards 22-1 through 22-R and all currently allocated objects 10. Each available server 12, therefore, has a view of the system state, including knowledge of which servers 12 belong to the subset 16 of available servers 12, which shards 22 are allocated to which available servers 12, which objects 10 are allocated to which shards 22, and the object state information associated with each allocated object 10.

The processing circuitry 64 in one or more embodiments implements an object processing module 74 that is configured to process the objects 10 contained in the shard(s) 22 that are allocated to the server 12-X. The processing circuitry 64 may further implement a coordination module 76, which operates in conjunction with like functionality in the other available servers 12 to provide the member server 54, via the sharing of coordination information 50.

In one embodiment, the set 14 of servers 12 comprises a service provisioning and activation platform configured to provision and activate telecommunication services in a telecommunications network, such as the telecommunications network 44 depicted in FIG. 2, for respective subscribers of the network. Here, each object 10 comprises a "managed object" that defines the provisioning needed for a given customer service order requesting provisioning and activation of one or more telecommunication services for a given subscriber. For example, the given customer service order comprises a provisioning order for a Subscriber Identification Module (SIM) used for authorizing access to the telecommunications network 44 by corresponding subscriber equipment, and the corresponding managed object represents a set of provisioning tasks for the SIM.

In other embodiments, the objects 10 incoming to the computer processing apparatus 30 for allocation and processing include one or more other types of processing requests, such as HTTP GET requests, or comprise storage-related operations in a data-storage context, or comprise database operations, such as database reads or writes. The objects 10 may be homogenous in terms of type or may be heterogeneous in terms of type. Even when the objects 10 are homogeneous, individual objects 10 may differ in terms of the resources needed to process them.

The processing circuitry 64 is configured in one or more embodiments to implement certain processing modules or units, such as an object processing module 74 that processes the objects 10 contained in the shard(s) 22 allocated to the server 12-X in its role as an available server 12. The processing circuitry 64 in such embodiments further implements a coordination module 76 that provides inter-server/inter-node coordination signaling for maintaining a coherent view of the system state, object-to-shard allocations, shard-to-server allocations, and object states, across the subset 16 of available servers 12. The coordination module 76, for example, is configured to exchange messages in support of the member server 54, which involves the processing circuitry 64 engaging in message signaling via the interface circuitry 62. In one example, the interface circuitry 62 includes a Network Interface Card (NIC) supporting one or more Ethernet-based connections. Of course, other physical-layer interfaces may be supported, and the proximity between the available servers 12 and the nature of the inter-server communication links dictates the implementation of the interface circuitry 62.

Figure 6:
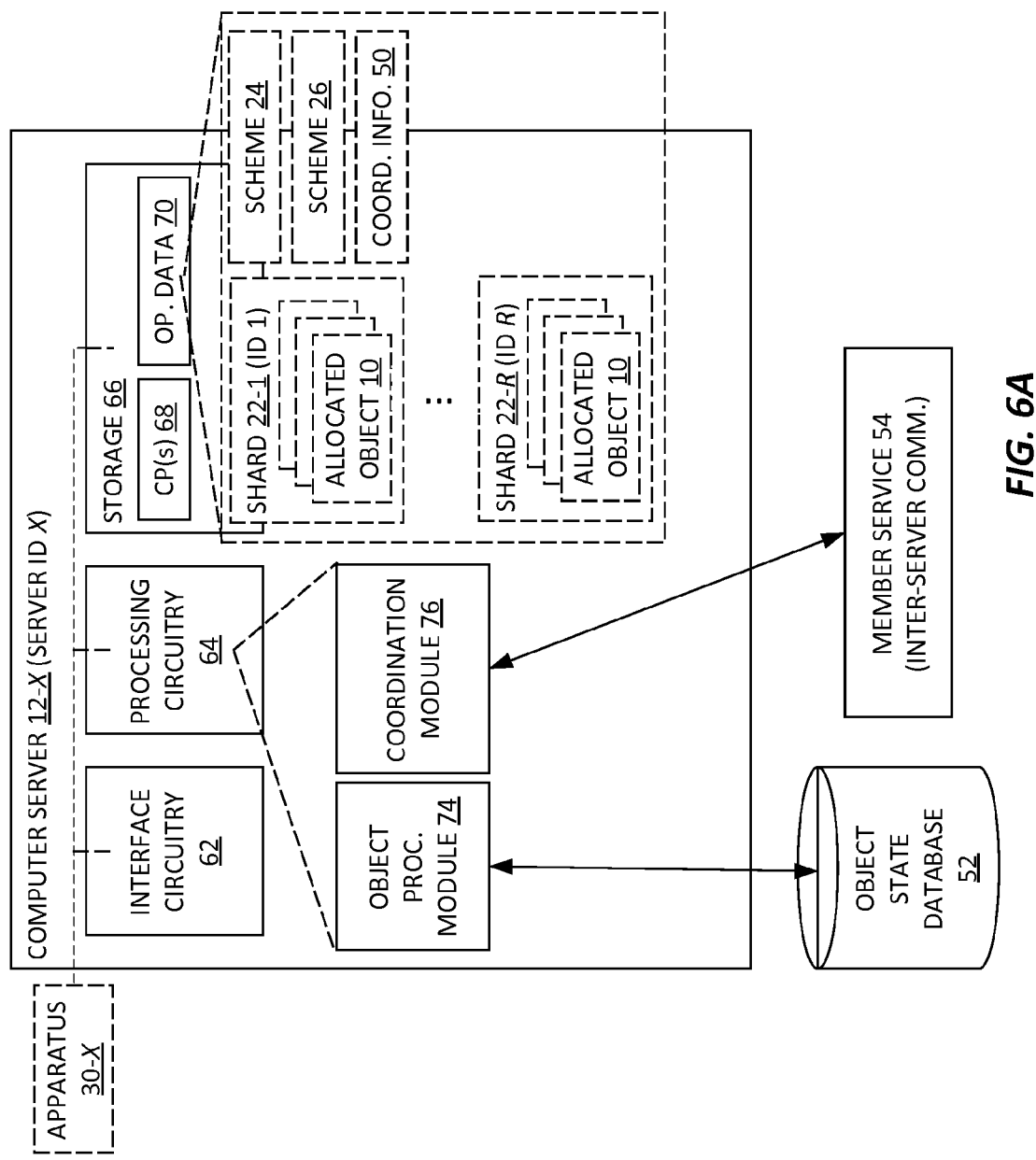
FIG. 6A is a block diagram of one embodiment of a computer server implementation, providing a distributed implementation of the computer apparatus introduced in FIG. 2.
FIGS. 6B and 6C are block diagrams of further distributed-implementation examples for the computer apparatus of FIG. 2.

In distributed implementations where the functionality of the computer processing apparatus 30 is replicated in or across the available servers 12, the aforementioned interface circuitry 32, processing circuitry 34, and storage 36 of the computer processing apparatus 30 may comprise or otherwise be implemented in the interface circuitry 62, the processing circuitry 64, and the storage 66 included in each available server 12. FIG. 6A depicts an example distributed arrangement, wherein all or part of the computer processing apparatus 30 of FIG. 2 is implemented in the server 12-X of FIG. 6, i.e., the interface circuitry 32 of the computer processing apparatus 30 is implemented at least in part in the interface circuitry 62 of each available server 12, the processing circuitry 34 of the computer processing apparatus 30 is implemented at least in part in the processing circuitry 64 of each available server 12, and the storage 36 of the computer processing apparatus 30 is implemented at least in part in the storage 66 of each available server 12.

In at least one embodiment, the processing circuitry 34 comprises one or more microprocessors or other type(s) of digital processing circuitry that is/are programmatically configured to carry out load-balancing operations as described herein, based on the execution of computer program instructions comprised in one or more computer programs 38 stored in the storage 36. For example, the storage 36 includes FLASH, EEPROM, NVRAM, SSD storage, or another non-volatile storage mechanism that stores the computer program(s) 38, for execution by the one or more microprocessors or other digital processing circuitry. To the extent that the processing circuitry 34 includes general-purpose processing circuitry, such processing circuitry is specially adapted according to the teachings herein, based on programmatic configuration according to computer-program execution. More broadly, the processing circuitry 34 comprises fixed circuitry, programmatically-configured circuitry, or some combination of both.

All such example details apply with respect to the interface circuitry 62, processing circuitry 64, and storage 66 of the server 12-X. Correspondingly, FIG. 6B shows one example of a distributed implementation of the computer processing apparatus 30, implemented as distributed apparatuses, e.g., 30-1, 30-2, 30-3, and 30-4. A first server 12-1 in the subset 16 of available servers 12 implements the functionality represented by the 30-1 reference number, a second server 12-2 in the subset 16 of available servers 12 implements the functionality represented by the 30-2 reference number, and so on. FIG. 6C continues the distributed example, by showing the server membership service (SMS) 54 as comprising distributed SMS functions 54-1, 54-2, 54-3, and 54-4, which may be understood as residing at respective servers 12 in the subset 16 of available servers 12.

In at least one embodiment, a computer-readable medium, comprising or included in the storage 36, stores a computer program 38 comprising program instructions that, when executed by processing circuitry 34 of a computer processing apparatus 30, configures the computer processing apparatus 30 to balance resource utilization among a set 14 of servers 12. The example computer program 38 comprises program instructions causing the computer processing apparatus 30 to: (a) determine a system state for the set 14 of servers 12, wherein some of the servers in the set may be unavailable, the system state being defined by the subset 16 of servers 12 that are currently available from among the set 14 of servers 12, where the number of possible system states is the number of unique subsets of servers 12 from among the set 14 of servers 12; (b) assign individual shards 22 to respective ones among the subset 16 of available servers 12 according to a shard-to-server allocation scheme 26 that, at least for mapped ones of the possible system states, prescribes a defined allocation of the shards 22 among the subset of servers 12 belonging to each mapped system state and minimizes the number of shard reassignments needed when the system state changes; (c) allocate new objects 10 incoming to the set of servers 12 for processing to respective ones of the shards 22 according to an object-to-shard allocation scheme 24 that balances resource requirements across the shards 22; and (d) responsive to the system state changing from a first one of the mapped system states to a second one of the mapped system states, reassigning individual ones of the shards 22 from one server 12 to another, as needed, in view of the differences between the shard-to-server assignments prescribed by the shard-to-server allocation scheme 26 for the first and second mapped system states.

Figure 7:
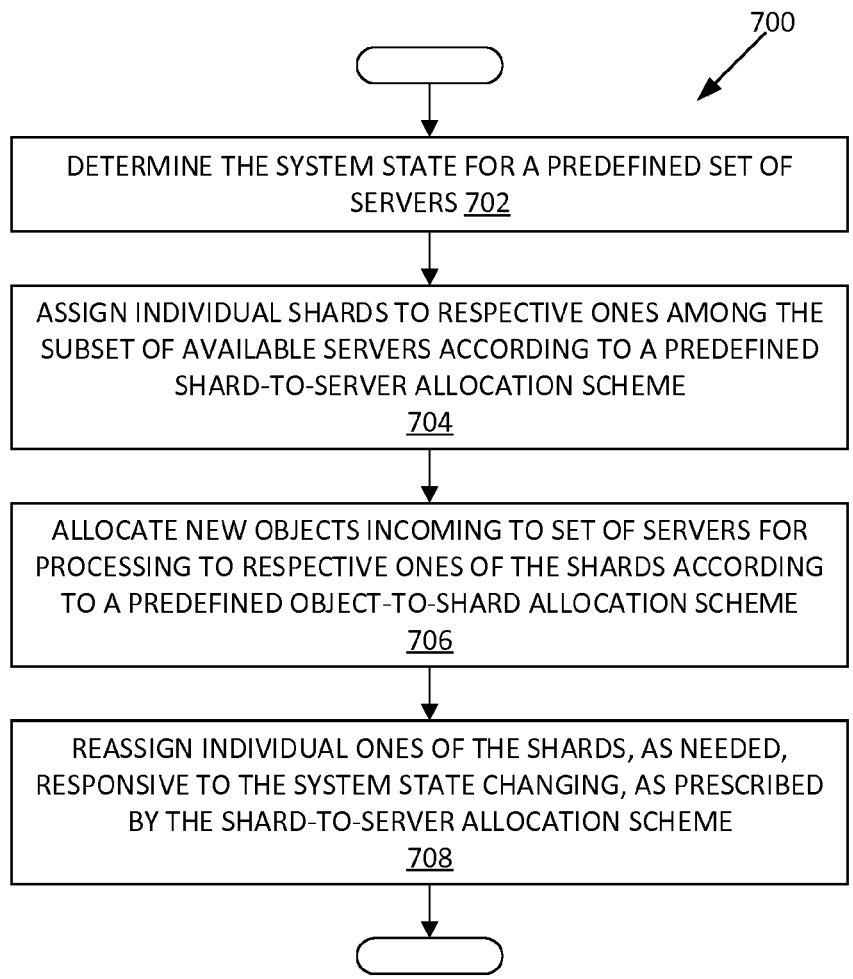
FIG. 7 is a logic flow diagram of one embodiment of a method of load balancing resource utilization across available servers in a set of servers.

FIG. 7 illustrates one embodiment of a method 700 of balancing resource utilization among a set 14 of servers 12, where the method 700 may be performed by the computer processing apparatus 30 according to the example arrangements depicted in FIGS. 2 and 6A, or via other processing and interface circuitry arrangements. The method 700 includes determining (Block 702) a system state for the set 14 of servers 12, wherein some of the servers in the set may be unavailable, where the system state is as previously described.

The method 700 further includes assigning (Block 704) individual shards 22 to respective ones among the subset 16 of available servers 12 according to a shard-to-server allocation scheme 26 that, at least for mapped ones of the possible system states, prescribes an allocation of the shards 22 among the subset of servers 12 belonging to each mapped system state and minimizes the number of shard reassignments needed when the system state changes. The shards 22 are as previously described.

Still further, the method 700 includes allocating (706) new objects 10 incoming to the set of servers 12 for processing to respective ones of the shards 22, according to an object-to-shard allocation scheme 24 that balances resource requirements across the shards 22. Of course, because only one server 12 "owns" an individual shard 22 at any given time, the allocation of incoming objects 10 to the set of servers 12 necessarily involves assigning or moving an individual object 10 to the server 12 that is responsible for the involved shard 22. In response to the system state changing from a first one of the mapped system states to a second one of the mapped system states, the method 700 includes reassigning (Block 708) individual ones of the shards 22 from one server 12 to another, as needed, in view of the differences between the shard-to-server assignments prescribed by the shard-to-server allocation scheme 26 for the first and second mapped system states.

The method 700 in one or more embodiments includes uniquely identifying each shard 22 in the set 20 of shards 22 by a corresponding shard identifier and uniquely identifying each server 12 in the set 14 of servers 12 by a corresponding server identifier. The shard-to-server allocation scheme 26 imposes, for example, a fixed mapping of shard identifiers to server identifiers, for each mapped system state.

Regarding scenarios where all objects 10 have comparable resource requirements, an example object-to-shard allocation scheme 24 allocates new objects 10 incoming to the set 14 of servers 12 for processing by one of: randomly assigning each new object 10 to one of the shards 22 in the set 20 of shards 22; assigning each new object 10 to one of the shards 22 in the set 20 of shards 22 according to a round-robin scheme; or assigning each new object 10 to one of the shards 22 in the set 20 of shards 22 according to hash-based scheme.

Regarding scenarios where not all objects 10 have comparable resource requirements, an example object-to-shard allocation scheme 24 allocates new objects 10 incoming to the set 14 of servers 12 for processing by allocating each new object 10 in dependence on the resource requirements of the new object 10. Additionally, regarding scenarios where not all servers 12 in the set 14 of servers 12 have equal capacities, an example object-to-shard allocation scheme 24 allocates new objects 10 incoming to the set 14 of servers 12 for processing by allocating each new object 10 in dependence on the respective capacities of the servers 12 in the set 14 of servers 12.

In one or more embodiments of the method 700, the method includes maintaining coordination information 50 in each available server 12. Example coordination information 50 comprises an indication of the system state, such that each available server 12 knows which other servers 12 in the set 14 of servers 12 are available. The example coordination information 50 further comprises the shard-to-server allocation scheme 26, such that each available server 12 knows which shards 22 belong to which servers 12 in the subset of available servers 12.

The method 700 in one or more embodiments includes implementing the shard-to-server allocation scheme 26 as a lookup table 56. For example, the table-based embodiments of the method 700 perform shard-to-server allocations and reallocations according to the table structure and corresponding permutation-based logic described in relation to FIGS. 3A, 4, and 5. One or more other embodiments of the method 700 use formulas or calculation steps that embody the permutation-based logic of the table 56, for shard-to-server allocations and re-allocations.

In at least one application of the method 700, the set 14 of servers 12 comprises a service provisioning, and activation platform configured to provision and activate telecommunication services in a telecommunications network 44, for respective subscribers of the telecommunications network 44. Each object 10 comprises a managed object that defines the provisioning needed for a given customer service order requesting provisioning and activation of one or more telecommunication services for a given subscriber. In an example, the given customer service order comprises a provisioning order for a Subscriber Identification Module (SIM) used for authorizing access to the telecommunications network 44 by corresponding subscriber equipment, and wherein the corresponding managed object represents a set of provisioning tasks for the SIM. In other telecommunication-related examples, the objects 10 comprise activation or provisioning tasks for any one or more of Home Location Registers (HLRs), Home Subscriber Servers (HSSs), Unified Data Management (UDM) functions, IP Multimedia Subsystems (IMSs), Voice over LTE (VoLTE) services, etc.

As part of its load-balancing operations, the method 700 in at least one embodiment includes maintaining an object state database 52 indicating current states of the objects 10 that have been allocated to each shard 22 and using the object state database 52 to restore or resume processing associated with each object 10 in a given shard 22, when the given shard 22 is reassigned from one server 12 to another server 12. As such, the object state database 52 allows a shard 22 to be moved from one server 22 to another, without necessarily having to repeat previously completed object processing for the objects 10 contained in the shard 22.

The method 700 may be implemented in a centralized fashion such as at a dedicated node that is central to the set 14 of computer servers 12, or may be implemented in a distributed fashion where the available servers 12 carry out operations necessary to implement the method 700 and coordinate between and among themselves, e.g., via the server membership service 54. The server membership service 54, which may be implemented based on generating and maintaining information at each available server 12 in communicating all or part of such information to the other available servers 12, provides each available server 12 with a synchronized, current view of the other available servers 12.

A distributed implementation of the method 700 or the computer processing apparatus 30 provides several performance and robustness advantages. For example, the contemplated distributed implementation minimizes data migrations performed in dependence on changes in system state and simplifies the achievement of allocation fairness. The object-to-shard allocation scheme 24 can follow essentially any function, including a random allocation or other scheme aimed at the fair allocation of objects 10 to shards 22, and the shard-to-server allocation scheme 26 can be tailored to minimize essentially any targeted cost function. The permutation-based logic embodied in the table 56 provides a mechanism for all available servers 12 to agree immediately upon all new shard-to-server allocations and all shard-to-server re-allocations arising from changes in the system state. The decision points are independent of past or next states, which greatly simplifies the operation of the overall arrangement.

Figure 8:
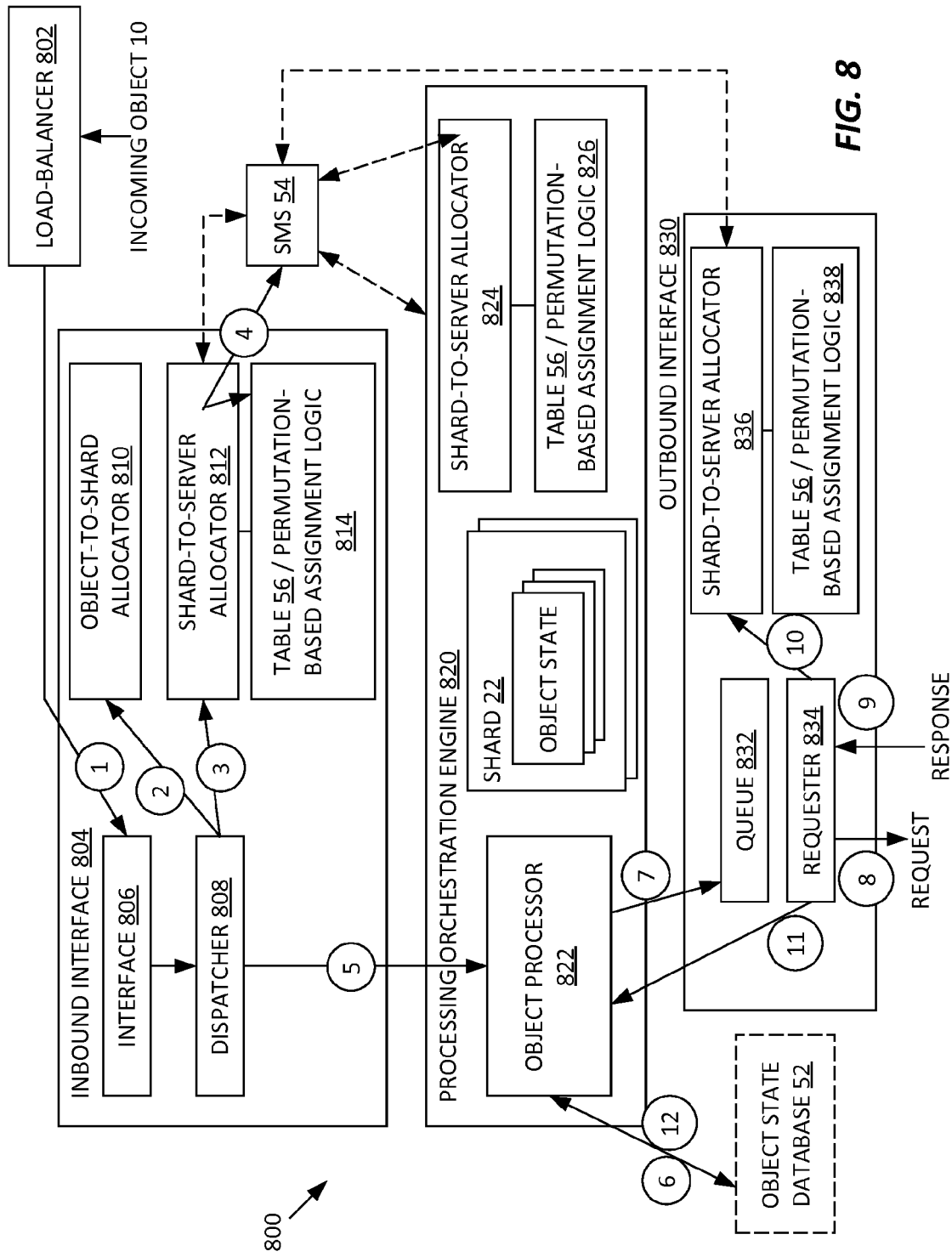
FIG. 8 is a block diagram of one embodiment of physical or functional entities implemented on a per-server basis, in a distributed implementation of load balancing across available servers in a set of servers.

FIG. 8 illustrates an example of physical and/or functional processing modules collectively referred to as a processing arrangement 800. The processing arrangement 800 serves as an illustration of the functionality that may be embodied within each server 12, for implementation of the processing apparatus 30 in a distributed arrangement across the available servers 12. That is, each server 12 may implement a copy of the arrangement 800 and the respective arrangements 800 may communicate with one another, including via the server membership services 54.

The processing arrangement 800 includes a load-balancer 802 that sends the incoming object 10—e.g., a job order—to an inbound interface 804 comprising an interface module 806 and a dispatcher 808 (Step 1). The dispatcher 808 queries an object-to-shard allocator 810 for a shard ID (Step 2), where the shard ID is the identifier of the shard 22 to which the object 10 should be assigned according to the object-to-shard allocation scheme 24. At Step 3, a shard-to-server allocator 812 uses the server membership service 54 to find out which servers 12 are available—i.e., to determine the membership of the available set 16 of servers 12—and the shard-to-server allocation scheme 26 to find the server 12 responsible for the shard 22 identified by the object-to-shard allocation scheme 24 for the object 10 (Step 4).

In the diagram, the shard-to-server allocator 812 may use a lookup table 56 to determine the server 12 associated with the incoming object 10, or it may use permutation-based assignment logic 814 to make the same determination by calculation rather than table. In either case, it shall be understood that such operations represent an application or use of the shard-to-server allocation scheme 26. Also, note that some of the look-up or discovery operations implied here need be done only once or only when the membership changes for the set 14 of available servers 12.

The dispatcher 808 sends the object 10 to a processing orchestration engine 820 on the server 12 responsible for the involved shard 22, and includes the shard ID in that communication (Step 5). The processing orchestration engine 820 includes an object processor 822, for processing objects 10.

In an example where the object 10 is an activation order for a service or a user within a telecommunication network, the processing may be understood as "activation" processing. The processing orchestration engine 820 includes an object processor 822 and may include memory or other storage for maintaining the data structures and "live" information representing the shard(s) 22 that are associated with the server 12 in which the processing orchestration engine 820 resides. Similar information is maintained for the objects 10 currently allocated to such shards 22. In this regard, each server 12 may maintain a local copy of the object state database 52 or may use a centralized copy of the object state database 52, at least for objects 10 that belong to other ones of the available servers 12. Further, to the extent that the inbound interface 804 is physically or functionally separate from the processing orchestration engine 820, the processing orchestration engine 820 may include its own shard-to-server allocator 824 and look-up table 56 or permutation-based assignment logic 826, to resolve shard-to-server allocations.

Responsive to determining that the object 10 belongs to one of the shards 22 for which the illustrated object processor 822 is responsible, the object processor 822 updates the object state database 52, including any order state information to be tracked for the object 10 (Step 6). Assuming that processing of the object 10—e.g., a job order—requires the involvement of downstream entities, such as other types of processing nodes or servers, the object processor 822 initiates downstream processing of the object 10 by generating an outbound request (Step 7) to an outbound queue 832 in an outbound interface 830. The outbound request includes the shard ID associated with the object 10 for which the request is generated. This step and all related processing steps taken with respect to the object 10 may be persisted/maintained as object state information in the object state database 52.

A requester 834 in the outbound interface 830 sends an outbound request to initiate the downstream processing needed for the object 10 (Step 8) and later receives a corresponding response (Step 9). The response could come much later, depending on the nature of the object 10 and the requested processing, e.g., minutes, hours, or even days later. A single object 10 may require multiple such requests and there may be multiple corresponding responses, and at least some requests may be pending in parallel, while others necessarily execute serially in interdependence upon completion of a related preceding request.

Upon receiving the response, the requester 834 uses its own shard-to-server allocator 836 to determine the server 12 responsible for the object 10 identified in the response (Step 10). Again, the allocation determination may use a lookup table 56 or permutation-based assignment logic 838. To the extent that the outbound interface 830 is implemented on the same processing resources as the inbound interface 804 and/or the processing orchestration engine 820, the shard-to-server allocator 836 may simply be a reuse of the functionality represented by the shard-to-server allocator 812 and/or 824.

It should be appreciated that the object-to-server allocations may have changed between sending a downstream processing request for the object 10 (Step 8) and receiving the corresponding response (Step 9), and that an incoming response for a given object 10 is routed or rerouted to the processing orchestration engine 820 in the server 12 that is currently responsible for the shard 22 identified in the response. Thus, the requester 834 sends the response to the processing orchestration engine 820 on the server 12 responsible for the shard 22 to which the involved object 10 belongs (as identified in Step 10), and it includes the shard ID when it sends the forwarded response (Step 11).

The response is persisted—i.e., object state information is updated for the object 10 in Step 12—and the object continues in the processing orchestration engine 820, potentially generating new southbound requests that are handled similarly. In case the processing orchestration engine 820 has become newly responsible for the involved object 10 as a consequence of shard reallocation, the processing orchestration engine 820 reconciles the object state information included in the response against the object state information last recorded by the previously-responsible processing orchestration engine 820.

In one or more embodiments of the processing arrangement 800, the processing entities 804, 820, and 830 may be implemented and run on separate, dedicated servers 12, e.g., in a pool of servers 12 to which load balancing is applied. As such, the entity 804 on one server 12 is operative to route a given incoming object 10 to the server 12 hosting the entity 820 responsible for the object 10, according to the allocation schemes 24 and 26. Similarly, the entity 830 on one server 12 is operative to route incoming responses to the correct instance of entity 820, where multiple servers 12 may host a respective instance or copy of the entity 820.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of balancing resource utilization among a set of servers, the method comprising:
determining a system state for the set of servers, wherein some of the servers in the set may be unavailable, the system state being defined by the subset of servers that are currently available from among the set of servers, and wherein the number of possible system states is the number of unique subsets of servers from among the set of servers;
assigning individual shards to respective ones among the subset of available servers according to a shard-to-server allocation scheme that, at least for mapped ones of the possible system states, prescribes an allocation of the shards among the subset of servers belonging to each mapped system state and minimizes the number of shard reassignments needed when the system state changes, wherein each shard is one among a set of shards and comprises a logical container for objects, and wherein each object comprises a job object or a storage object that requires respective resources on the server to which the object is assigned;
allocating new objects incoming to the set of servers for processing to respective ones of the shards according to an object-to-shard allocation scheme that balances resource requirements across the shards; and
responsive to the system state changing from a first one of the mapped system states to a second one of the mapped system states, reassigning individual ones of the shards from one server to another, as needed, in view of the differences between the shard-to-server assignments prescribed by the shard-to-server allocation scheme for the first and second mapped system states;
wherein the shard-to-server allocation scheme uses a permuted copy of a weight vector for each shard, comprising an ordered set of weights expressing relative preferences for assigning the shard to respective ones of the servers in the set of servers, the order of the weights being permutated so that each permuted copy of the weight vector is unique, and assigns each shard to the available server having the highest relative preference, as indicated by the weight vector that corresponds to the shard.

2. The method of claim 1, further comprising uniquely identifying each shard in the set of shards by a corresponding shard identifier and uniquely identifying each server in the set of servers by a corresponding server identifier, and wherein the shard-to-server allocation scheme imposes a fixed mapping of shard identifiers to server identifiers, for each mapped system state.

3. The method of claim 1, wherein not all servers in the set of servers have equal capacities and wherein the object-to-shard allocation scheme allocates new objects incoming to the set of servers for processing by allocating each new object in dependence on the respective capacities of the servers in the set of servers.

4. The method of claim 1, further maintaining coordination information in each available server, the coordination information comprising an indication of the system state, such that each available server knows which other servers in the set of servers are available, and the coordination information further comprising the shard-to-server allocation scheme, such that each available server knows which shards belong to which servers in the subset of available servers.

5. The method of claim 1, wherein the set of servers comprises a service provisioning and activation platform configured to provision and activate telecommunication services in a telecommunications network, for respective subscribers of the telecommunications network, and wherein each object comprises a managed object that defines the provisioning needed for a given customer service order requesting provisioning and activation of one or more telecommunication services for a given subscriber.

6. The method of claim 5, wherein the given customer service order comprises a provisioning order for a Subscriber Identification Module (SIM) used for authorizing access to the telecommunications network by corresponding subscriber equipment, and wherein the corresponding managed object represents a set of provisioning tasks for the SIM.

7. The method of claim 1, further comprising maintaining an object state database indicating current states of the objects that have been allocated to each shard and using the object state database to restore or resume processing associated with each object in a given shard, when the given shard is reassigned from one server to another server.

8. A computer processing apparatus operative to balance resource utilization among a set of servers, the computer processing apparatus comprising:
   interface circuitry; and
   processing circuitry configured to communicate via the interface circuitry and, based on such communications:
      determine a system state for the set of servers, wherein some of the servers in the set may be unavailable, the system state being defined by the subset of servers that are currently available from among the set of servers, and wherein the number of possible system states is the number of unique subsets of servers from among the set of servers;
      assign individual shards to respective ones among the subset of available servers according to a shard-to-server allocation scheme that, at least for mapped ones of the possible system states, prescribes a defined allocation of the shards among the subset of servers belonging to each mapped system state and minimizes the number of shard reassignments needed when the system state changes, wherein each shard is one among a set of shards and comprises a logical container for objects, and wherein each object comprises a job object or a storage object that requires respective resources on the server to which the object is assigned;
      allocate new objects incoming to the set of servers for processing to respective ones of the shards according to an object-to-shard allocation scheme that balances resource requirements across the shards; and
      responsive to the system state changing from a first one of the mapped system states to a second one of the mapped system states, reassign individual ones of the shards from one server to another, as needed, in view of the differences between the shard-to-server assignments prescribed by the shard-to-server allocation scheme for the first and second mapped system states;
      wherein the shard-to-server allocation scheme uses a permuted copy of a weight vector for each shard, comprising an ordered set of weights expressing relative preferences for assigning the shard to respective ones of the servers in the set of servers, the order of the weights being permuted so that each permuted copy of the weight vector is unique, and assigns each shard to the available server having the highest relative preference, as indicated by the weight vector that corresponds to the shard.

9. The computer processing apparatus of claim 8, wherein the processing circuitry is configured to uniquely identify each shard in the set of shards by a corresponding shard identifier and uniquely identify each server in the set of servers by a corresponding server identifier, and wherein the shard-to-server allocation scheme imposes a fixed mapping of shard identifiers to server identifiers, for each mapped system state.

10. The computer processing apparatus of claim 8, wherein all objects have comparable resource requirements and wherein the object-to-shard allocation scheme allocates new objects incoming to the set of servers for processing by one of: randomly assigning each new object to one of the shards in the set of shards; assigning each new object to one of the shards in the set of shards according to a round-robin scheme; or assigning each new object to one of the shards in the set of shards according to hash-based scheme.

11. The computer processing apparatus of claim 8, wherein not all objects have comparable resource requirements and wherein the object-to-shard allocation scheme allocates new objects incoming to the set of servers for processing by allocating each new object in dependence on the resource requirements of the new object.

12. The computer processing apparatus of claim 8, wherein not all servers in the set of servers have equal capacities and wherein the object-to-shard allocation scheme allocates new objects incoming to the set of servers for processing by allocating each new object in dependence on the respective capacities of the servers in the set of servers.

13. The computer processing apparatus of claim 8, wherein the processing circuitry is configured to maintain coordination information in each available server, the coordination information comprising an indication of the system state, such that each available server knows which other servers in the set of servers are available, and the coordination information further comprising the shard-to-server allocation scheme, such that each available server knows which shards belong to which servers in the subset of available servers.

14. The computer processing apparatus of claim 8, wherein the set of servers comprises a service provisioning and activation platform configured to provision and activate telecommunication services in a telecommunications network, for respective subscribers of the telecommunications network, and wherein each object comprises a managed object that defines the provisioning needed for a given customer service order requesting provisioning and activation of one or more telecommunication services for a given subscriber.

15. The computer processing apparatus of claim 14, wherein the given customer service order comprises a provisioning order for a Subscriber Identification Module (SIM) used for authorizing access to the telecommunications network by corresponding subscriber equipment, and wherein the corresponding managed object represents a set of provisioning tasks for the SIM.

16. The computer processing apparatus of claim 8, wherein the processing circuitry is configured to maintain an object state database indicating current states of the objects that have been allocated to each shard and use the object state database to restore or resume processing associated with each object in a given shard, when the given shard is reassigned from one server to another server.

17. A computer-readable medium storing a computer program comprising program instructions that, when executed by processing circuitry of a computer processing apparatus, configures the computer processing apparatus to balance resource utilization among a set of servers, the computer program comprising program instructions causing the computer processing apparatus to:

determine a system state for the set of servers, wherein some of the servers in the set may be unavailable, the system state being defined by the subset of servers that are currently available from among the set of servers, and wherein the number of possible system states is the number of unique subsets of servers from among the set of servers;

assign individual shards to respective ones among the subset of available servers according to a shard-to-server allocation scheme that, at least for mapped ones of the possible system states, prescribes a defined allocation of the shards among the subset of servers belonging to each mapped system state and minimizes the number of shard reassignments needed when the system state changes, wherein each shard is one among a set of shards and comprises a logical container for objects, and wherein each object comprises a job object or a storage object that requires respective resources on the server to which the object is assigned;

allocate new objects incoming to the set of servers for processing to respective ones of the shards according to an object-to-shard allocation scheme that balances resource requirements across the shards; and responsive to the system state changing from a first one of the mapped system states to a second one of the mapped system states, reassigning individual ones of the shards from one server to another, as needed, in view of the differences between the shard-to-server assignments prescribed by the shard-to-server allocation scheme for the first and second mapped system states;

wherein the shard-to-server allocation scheme uses a permuted copy of a weight vector for each shard, comprising an ordered set of weights expressing relative preferences for assigning the shard to respective ones of the servers in the set of servers, the order of the weights being permutated so that each permuted copy of the weight vector is unique, and assigns each shard to the available server having the highest relative preference, as indicated by the weight vector that corresponds to the shard.

* * * * *